United States Patent
Denes et al.

(10) Patent No.: US 7,862,782 B2
(45) Date of Patent: Jan. 4, 2011

(54) APPARATUS AND METHODS FOR PRODUCING NANOPARTICLES IN A DENSE FLUID MEDIUM

(75) Inventors: Ferencz S. Denes, Madison, WI (US); Sorin O. Manolache, Madison, WI (US); Hongquan Jiang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1028 days.

(21) Appl. No.: 11/622,749

(22) Filed: Jan. 12, 2007

(65) Prior Publication Data

US 2008/0169182 A1 Jul. 17, 2008

(51) Int. Cl.
*B01J 19/08* (2006.01)
*B01J 19/12* (2006.01)
*H05F 3/00* (2006.01)

(52) U.S. Cl. ............... 422/186.04; 422/186.21; 204/164

(58) Field of Classification Search ............ 422/186.04, 422/186.21; 204/164
See application file for complete search history.

(56) References Cited

U.S. PATENT DOCUMENTS

| | | | |
|---|---|---|---|
| 3,169,914 A | 2/1965 | Young et al. | |
| 3,840,750 A | 10/1974 | Davis et al. | |
| 3,954,954 A | 5/1976 | Davis et al. | |
| 4,016,448 A | 4/1977 | Nighan et al. | |
| 4,416,751 A | 11/1983 | Berkowitz et al. | |
| 4,731,515 A | 3/1988 | Savage et al. | |
| 5,061,354 A | 10/1991 | Smith et al. | |
| 5,234,723 A | 8/1993 | Babacz | |
| 5,368,724 A | 11/1994 | Ayers et al. | |
| 5,534,232 A | 7/1996 | Denes et al. | |
| 5,543,133 A | 8/1996 | Swanson et al. | |
| 5,585,020 A | 12/1996 | Becker et al. | |
| 5,655,210 A | 8/1997 | Gregoire et al. | |
| 5,766,447 A | 6/1998 | Creijghton | |
| 5,876,663 A | 3/1999 | Laroussi | |
| 5,879,715 A | 3/1999 | Higgins et al. | |
| 5,908,539 A | 6/1999 | Young et al. | |
| 6,054,495 A | 4/2000 | Markowitz et al. | |
| 6,096,564 A | 8/2000 | Denes et al. | |
| 6,187,206 B1 | 2/2001 | Bernier et al. | |
| 6,228,266 B1 | 5/2001 | Shim | |
| 6,264,898 B1 | 7/2001 | Ingram | |
| 6,328,898 B1 | 12/2001 | Akiyama et al. | |
| 6,749,759 B2 | 6/2004 | Denes et al. | |

(Continued)

OTHER PUBLICATIONS

Notice of Allowance received in U.S. Appl. No. 11/525,773, Apr. 29, 2010.

(Continued)

*Primary Examiner*—Luan V Van
(74) *Attorney, Agent, or Firm*—Bell & Manning, LLC (57) ABSTRACT

An apparatus and method are disclosed for producing nanoparticles in a dense fluid medium. The method is based on the formation of nanoparticles from nanoparticle precursors in a dense fluid medium in which a plasma discharge is created between electrodes submerged in the dense fluid medium. The electrodes define a plasma discharge zone between opposing electrode discharge faces and further define an internal cavitation zone into which a cavitation gas is released, creating bubbles in the dense fluid medium. The result is the efficient production of nanoparticles using a high-frequency, high-voltage electric field to react densephase precursors in an atmospheric pressure, low temperature environment.

21 Claims, 4 Drawing Sheets

U.S. PATENT DOCUMENTS

| | | |
|---|---|---|
| 6,846,565 B2 | 1/2005 | Korgel et al. |
| 7,128,816 B2 | 10/2006 | Denes et al. |
| 2002/0037320 A1 | 3/2002 | Denes et al. |
| 2002/0074290 A1 | 6/2002 | Jensen |
| 2006/0051505 A1 | 3/2006 | Kortshagen et al. |
| 2008/0152938 A1 | 6/2008 | Kelman et al. |

OTHER PUBLICATIONS

S. Manolache et al, Synthesis of Nanoparticles under Cold-Plasma Conditions, Journal of Photopolymer Science and Technology, 2000, pp. 51-62, vol. 13, No. 1, American Physics Journal.

APPARATUS AND METHODS FOR PRODUCING NANOPARTICLES IN A DENSE FLUID MEDIUM

REFERENCE TO GOVERNMENT RIGHTS

This invention was made with United States government support awarded by the USDA/CSREES under grant number 2004-35201-14121. The United States government has certain rights in this invention.

FIELD OF THE INVENTION

The present invention relates to apparatus and methods for producing nanoparticles in a dense fluid medium using a plasma discharge. More particularly, the present invention relates to an apparatus and method for the production of a suspension of particles having an average diameter of no more than about 500 nm and a process for using the apparatus.

BACKGROUND OF THE INVENTION

Nanoparticles are important components in the development of catalytic, sensor, aerosol, filter, biomedical, magnetic, dielectric, optical, electronic, structural, ceramic, and metallurgical applications.

Various processes to produce nanoparticles, including semiconductor and metal nanoparticles, are known in the prior art. For example, U.S. Pat. No. 5,543,133, issued to Swanson et al., discloses a process of preparing nanoparticulate agents comprising the steps of: (i) preparing a premix of the agent and a surface modifier; and (ii) subjecting the premix to mechanical means to reduce the particle size of the agent, the mechanical means producing shear, impact, cavitation and attrition.

Likewise, U.S. Pat. No. 5,585,020, issued to Becker et al., teaches a process of producing nanoparticles having a narrow size distribution by exposing microparticles to an energy beam, such as a beam of laser light, above the ablation threshold of the microparticles.

Also, U.S. Pat. No. 5,879,750, issued to Higgins et al. teaches a process for producing inorganic nanoparticles by precipitating the inorganic nanoparticles by a precipitating agent for a microemulsion with a continuous and a non-continuous phase and concentrating the precipitated nanoparticles employing an ultrafiltration membrane.

Additionally, U.S. Pat. No. 6,540,495, issued to Markowicz et al., teaches a process for making a powder containing metallic particles comprising the steps of: (i) forming a dispersion of surfactant vesicles in the presence of catalytic metal ions; (ii) adjusting the pH to between 5.0 and 7.0; (iii) mixing the dispersion with a bath containing second metal ions; and (iv) incubating the mixed dispersion at a temperature sufficient to reduce the second metal ions to metal particles having an average diameter between 1 to 100 nm.

CS Pro Systems advertises a high voltage AC processor producing nanoparticles of colloidal silver. The HVAC process is claimed to produce particle sizes between 0.002 to 0.007-9 microns by imposing an AC potential of 10,000 volts across two silver electrodes in a distilled water medium.

More recently, U.S. Pat. No. 6,848,565, issued to Korgel et al., disclosed a method for fabricating semiconductor nanoparticles by heating a mixture of an organometallic precursor and a capping agent at a temperature wherein the precursor decomposes, and the nanoparticles are formed.

Still more recently, U.S. Pat. No. 7,128,816, issued to Denes et al., describes a method and apparatus for producing colloidal dispersions of conductive nanoparticles by generating a plasma reaction in a dense fluid medium between two electrodes, one of which is a rotating electrode.

SUMMARY OF THE INVENTION

An apparatus and method for producing a variety of nanoparticles in a dense medium plasma is disclosed. The apparatus is a plasma reactor that includes a plasma reaction vessel that defines an internal reaction chamber into which a dense fluid medium may be introduced. An electrode assembly including a first electrode and a second electrode housed within the reaction chamber is submerged in the dense fluid medium. The first and second electrodes each include a ring-shaped discharge face, which is typically a planar surface, that defines (e.g., encloses) a central electrode opening. The first and second electrodes further include an electrode wall extending away from the discharge surface and defining a first and second electrode cavity. Within the reaction chamber the first and second electrodes are disposed opposite and facing one another such that the discharge faces of the first and second electrodes are separated by a gap and the oppositely-facing first and second electrode cavities, along with the gap, provide a cavitation zone. An inlet port extends into the cavitation zone and introduces a cavitation gas into the dense fluid medium within the cavitation zone, creating bubbles in the dense medium plasma. The bubbles result in the fast transfer of the multiple arclets (filamentary discharges) of the plasma discharge around the electrode discharge surfaces, promoting the plasma-induced production of nanoparticles from nanoparticle pre-cursors in the dense fluid medium. In one embodiment the cavitation gas inlet port is a coaxial arrangement of two electrically conductive cylinders separated by an electrically insulating cylinder wherein a thin channel between one of the electrically conductive cylinders and the insulating cylinder provides a ring-shaped aperture through which a cavitation gas may be introduced into the cavitation zone. In this embodiment, the first electrode may be mounted to the first of the two electrically conductive cylinders and the second electrode may be mounted to the second of the two electrically conductive cylinders.

Nanoparticles may be produced using the plasma reactor as follows. A dense fluid medium containing one or more nanoparticle precursors may be introduced into the reaction chamber until the electrodes of the electrode assembly are submerged. A cavitation gas is then introduced into the cavitation zone through the gas inlet port to create bubbles ("cavitation") in the dense fluid medium. An electrical potential is applied across the discharge face of the first electrode and the discharge face of the second electrode to produce a plasma between the two electrodes. This plasma results in the formation of nanoparticles from the nanoparticle precursors. In some embodiments, the nanoparticles are hybrid nanoparticles that include one or more elements derived from the nanoparticle precursors and one or more elements sputtered from the first and/or second electrodes.

The present apparatus and methods are well suited for the production of semiconductor nanoparticles, metal nanoparticles and hybrid nanoparticles comprising metals and/or semiconductors. Such nanoparticles are useful for a wide variety of applications including, but not limited to, single-electron transistors, semiconductor lasers, optical systems, markers for biological materials, and drug delivery systems.

Further objects, features, and advantages of the invention will be apparent from the following detailed description when taken in conjunction with the accompanying drawings.

DETAILED DESCRIPTION OF THE PRESENT INVENTION

An apparatus and method are disclosed for producing nanoparticles in a dense fluid medium. The method is based on the formation of nanoparticles from nanoparticle precursors in a dense fluid medium in which a plasma discharge is created between electrodes submerged in the dense fluid medium. The electrodes define a plasma discharge zone between the electrodes and further define an internal cavitation zone between the electrodes into which a cavitation gas is released, creating bubbles in the dense fluid medium within the cavitation zone. In the presence of the discharges between the electrodes, nanoparticle precursors in the dense fluid medium form nanoparticles. The bubble formation (cavitation) is very important to the efficiency of the plasma reactor in that the bubbles render a volume reaction (i.e., the reaction occurs within the volume of the bubbles) rather than an interphase reaction. The result is the efficient production of nanoparticles using a high-frequency, high-voltage electric field to react dense-phase precursors in an atmospheric pressure, low temperature environment. This result may be achieved even when the arclets in the discharge have high temperatures due to the high heat dissipation of the liquid reaction medium.

For the purpose of clarifying the nature of the present invention, certain terms shall be defined as follows.

As used herein, the term "nanoparticle" refers to particles having an average diameter of less than about 500 nm, preferably less than about 100 nm, more preferably less than about 50 nm, and most preferably less than about 10 nm.

As used herein, the terms "electrically conducting material," "electrically conductive material" or "conductor" are interchangeable and refer to a class of materials incapable of supporting electric strain such that a charge given to a conductor spreads to all parts of the body of the conductor.

The term "dense fluid medium" refers to materials that are liquid at the operating conditions in the plasma reactor.

The term "plasma" is used to identify gaseous complexes which may comprise electrons, positive or negative ions, gaseous atoms, and molecules in the ground state or any higher state of excitation including light quanta. The most common method for achieving a plasma state is through an electrical discharge.

The term "nanoparticle precursor" means any molecule capable of forming a nanoparticle in a plasma discharge.

Figure 1:
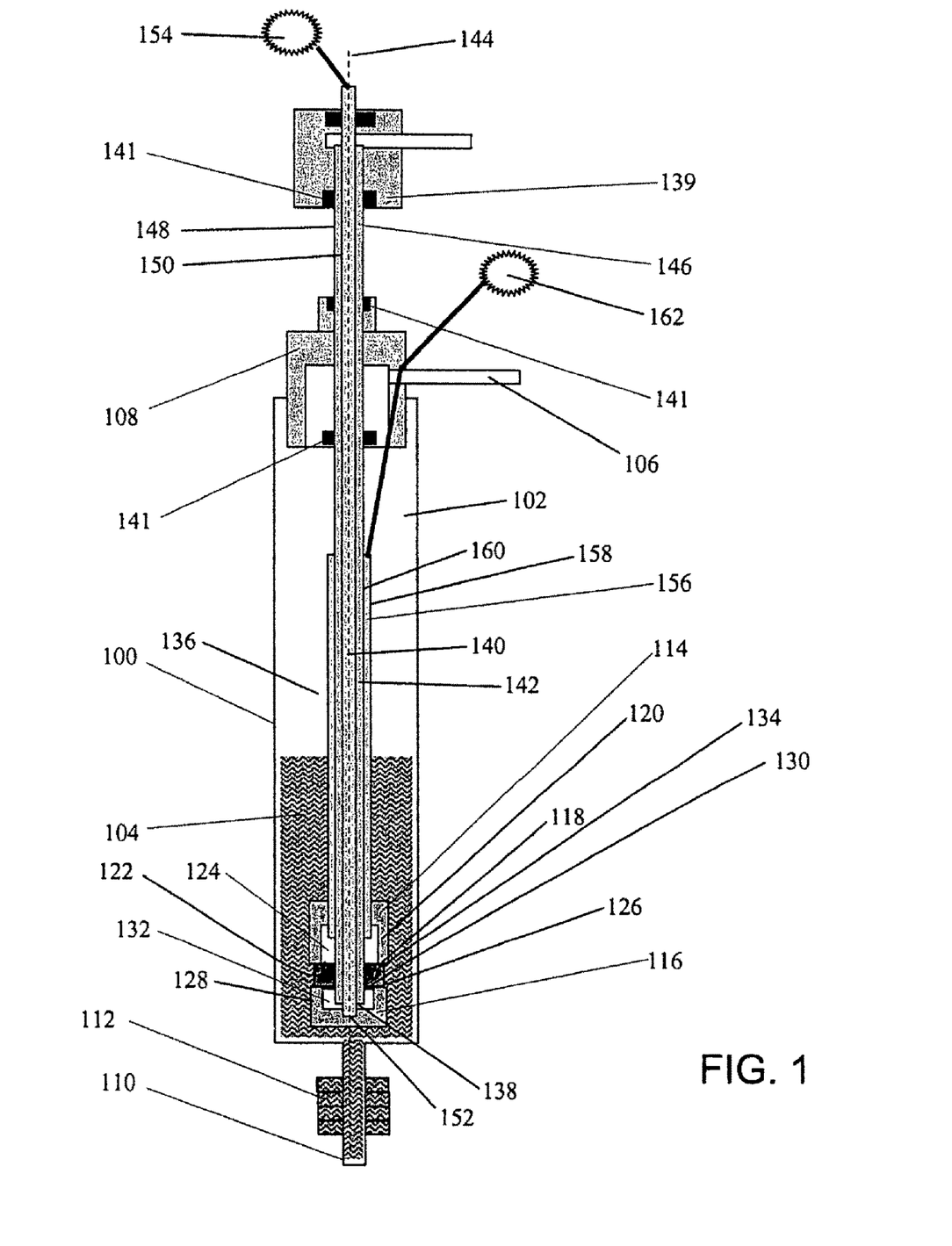
FIG. 1 shows a schematic representation of a dense fluid medium plasma reactor.

A cross-sectional view of an illustrative example of a plasma reactor that may be used to produce nanoparticles is shown is FIG. 1. The plasma reactor includes a reaction vessel 100 that defines an internal reaction chamber 102 which houses a dense fluid medium 104 containing one or more nanoparticle precursors. The reaction vessel further includes at least one dense medium inlet port 106 through which a dense fluid medium may be introduced into the reaction chamber through an inlet manifold 108. An outlet channel 110, shown in FIG. 1 at the lower end of the reaction vessel, allows the dense fluid medium, including any nanoparticles suspended therein, to be discharged from the reaction chamber. Optionally, one or more magnets 112 may be disposed around the outlet channel to allow for the separation of any magnetic nanoparticles in the discharged dense fluid medium. The reaction vessel may be made of any material that is substantially unreactive toward the chemicals of the dense fluid medium and that does not interfere with the discharge between the electrodes. In one embodiment, the reaction vessel comprises a glass tube.

An electrode assembly that includes two electrodes 114, 116 is housed within the reaction chamber. The first electrode 114 includes a discharge face 118 at its distal end and an electrode wall 120 extending upwardly from the discharge face. The discharge face defines a central electrode opening 122 and the electrode wall defines an electrode cavity 124 extending upwardly from the central electrode opening 122. The second electrode 116 includes a discharge face 126 at its distal end and an electrode wall 128 extending downwardly from the discharge face. The discharge face of the second electrode also defines a central electrode opening 130 and the electrode wall of the second electrode defines an electrode cavity 132 extending downwardly from the central electrode opening 130. (As used herein, the terms "upwardly" and "downwardly" are intended only to convey generally opposite directions. These terms do necessarily mean that the components to which they refer are extending in any specific direction.) The discharge face of the first electrode is disposed opposite and facing the discharge face of the second electrode, desirably in a parallel or substantially parallel arrangement, and the first and second discharge faces are separated by a gap 134. In this configuration, the first and second electrode cavities 124, 132 are disposed opposite and facing one another. Together, the first electrode cavity, the second electrode cavity, and the gap define a cavitation zone.

The discharge faces of the first and second electrodes are generally ring-shaped, wherein a ring-shape is defined as a shape that encloses or substantially encloses a central aperture. The ring-shapes may be symmetrical or non-symmetrical, and include circular rings, square rings, triangular rings, and the like. The electrodes may be made of a variety of electrically conducting materials, such as metals, including, but not limited to, stainless steel, silver, gold, copper, aluminum, antimony, titanium, bismuth, iron, lead, molybdenum, nickel, platinum, tin, tungsten, zinc, or a rare earth (group IIIB of the periodic table as published in *Hawley's Condensed Chemical Dictionary*, $12^{th}$ ed., front cover).

A gas inlet port 136 having an aperture 138 at its distal end extends into the cavitation zone of the electrode assembly. In the embodiment depicted in FIG. 1, the gas inlet port has a coaxial configuration and includes a central elongated member 140 (e.g., a cylindrical rod) having an outer wall 142 and a longitudinal axis 144. The inlet port further includes a hollow elongated insulating member 146 (e.g., a cylindrical tube) having an outer wall 148 and an inner wall 150. The insulating material is desirably made from an electrically insulating material, such as ceramic. The elongated insulating member is disposed around the central elongated member in a coaxial relationship wherein the outer wall of the central elongated member is separated from the inner wall of the insulating member by a thin channel (not shown) which provides ring-shaped aperture 138. The gas inlet port is in communication with a gas source (not shown) through which a cavitation gas may be introduced into the cavitation zone through a gas inlet manifold 139. The gas inlet port may be sealed with seals 141, such as o-rings or gaskets, as it passes through the various apparatus components into the reaction chamber. As shown in FIG. 1, the seals are not exposed to the dense fluid medium or the plasma.

As shown in FIG. 1, the central elongated member may have a distal end 152 that extends beyond the distal end of the elongated insulating member and the second electrode may be mounted to the distal end 152. The central elongated member may be composed of an electrically conductive material, such that a voltage source 154 in electrical communication with the central elongated member is able to supply a charge to the second electrode. The inlet port may further include an external hollow elongated conducting member 156 having an outer wall 158 and an inner wall 160. The elongated conducting member may be disposed around the elongated insulating member in a coaxial relationship wherein the outer wall of the insulating member is disposed against the inner wall of the elongated conducting member, and the first electrode 114 is mounted to the elongated conducting member. Like the central elongated member, the external conducting member is composed of an electrically conductive material, such that a voltage source 162 in electrical communication with the external conducting member is able to supply a charge to the first electrode. FIG. 1 depicts a preferred embodiment wherein the longitudinal axis of the inlet port runs through the centers of the first and second central electrode openings.

The first and second electrodes are desirably removably and adjustably mounted to the inlet port, such that they may be removed from the electrode assembly for replacement or cleaning and so that the height of the gap between the first and second electrode discharge faces may be adjusted as desired. For example, the first and second electrodes may be threaded and mounted to the external elongated conducting member and the central elongated member of the inlet port using a screw-type mechanism, such that they may be screwed onto and off of the inlet port.

The use of ring-shaped electrodes is advantageous because it results in a separation between the exposed outer wall of the insulating member and the discharge zone within the gap between the first and second discharge faces. This minimizes or prevents erosion of the insulating member by the plasma discharge.

Nanoparticles may be produced using the present apparatus according to the following method. A dense fluid medium that includes one or more nanoparticle precursors is introduced into the plasma reaction chamber, such that the first and second electrodes are submerged in the dense fluid medium. A cavitation gas is then introduced into the cavitation zone through the aperture in the gas inlet port where it creates bubbles in the dense fluid medium. The cavitation gas may be any gas that does not produce adverse reactions with the dense fluid medium, the nanoparticle precursor, or the nanoparticles and that does not interfere with the plasma reaction. Examples of suitable cavitation gases include air and rare gases, such as argon or hydrogen, and mixtures thereof. An electrical discharge is then ignited between the opposing discharge faces of the first and second electrodes to produce a plasma discharge between the first and second electrodes for a time sufficient to produce nanoparticles from the nanoparticle precursor. The cavitation caused by the bubbles results in the fast transfer of the discharge (i.e., the multiple arclets) to various locations on the electrode discharge surfaces, which promotes the plasma-induced chemical reaction of the nanoparticle precursor to form nanoparticles and eliminates the need to stir the dense fluid medium in the cavitation zone. This simplifies the plasma reactor design by eliminating the need for a rotating electrode. Nanoparticles produced in the plasma may be discharged from the reaction chamber through the outlet channel. Separation of magnetic nanoparticles may be effected by passing the magnetic nanoparticles through an outlet channel surrounded by magnets.

The present method, which uses a liquid form of the nanoparticle precursors represents an advantage over methods which use vapor forms of the nanoparticle precursors, particularly in instances when a toxic precursor is used (e.g., silicon tetrachloride).

Nanoparticles that may be produced using the present apparatus and methods include nanoparticles comprising a semiconducting element ("semiconductor nanoparticles") and nanoparticles comprising a metal element ("metal nanoparticles"). The nanoparticles may be composed of a single element or may be alloys of two or more elements. In some embodiments, the nanoparticles are hybrid nanoparticles comprised of at least two elements wherein a first element (e.g., carbon) is derived from the plasma reaction of a nanoparticle precursor and the second element (e.g., a metal) is sputtered from the first and/or second electrode during the plasma reaction. The interchangeable electrode configuration of the present apparatus permits the use of selected metal electrode materials, including stainless steel, iron, nickel, titanium, and copper, depending upon the desired content of the hybrid nanoparticles to be produced. For example, iron, stainless steel, and nickel electrodes may be used to incorporate small amounts of magnetic material into the carbon nanoparticles. In this case, an efficient removal of the nanoparticles can be accomplished using magnets at the outlet channel of the plasma reaction chamber.

The present apparatus and methods are well suited for the production of silicon nanoparticles and carbon nanoparticles. Examples of nanoparticle precursors for the production of silicon nanoparticles include silicon tetrachloride and silicon tetrabromide. Examples of nanoparticle precursors for the production of carbon nanoparticles include hydrocarbons such as benzene, toluene, xylene, hexane, cyclohexane, and octane.

EXAMPLES

Silicon and carbon nanoparticles were fabricated according to the following procedure. A liquid nanoparticle precursor was introduced into the plasma reaction chamber of a plasma reactor of the type shown in FIG. 1. A cavitation gas was then passed into the reaction chamber through the gas inlet port at a pre-selected flow rate to de-gas the liquid and generate bubbles. A discharge was initiated between the first and second electrodes and sustained for a desired period of time to produce nanoparticles from the nanoparticle precursors. At the end of the plasma reaction, the reaction vessel was removed and the nanoparticles were separated from the liquid using centrifugation and washing in, for example, dichloromethane. The nanoparticles and the supernatant were then analyzed using infrared spectroscopy, electron spectroscopy for chemical analysis (ESCA), scanning electron microscopy (SEM), and gas chromatography/mass spectrometry (GC/MS).

The following reaction parameters were used during the synthesis of the nanoparticles: cavitation gas flow rate=2-10 sscm; AC voltage=10-20 kV; frequency of driving field=100-1000 kHz; reaction time=0.5-10 minutes; volume of liquid medium analyzed=2-10 mL. However, reaction parameters outside of these ranges may also be used.

Example 1

Production of Silicon Nanoparticles

Figure 2:
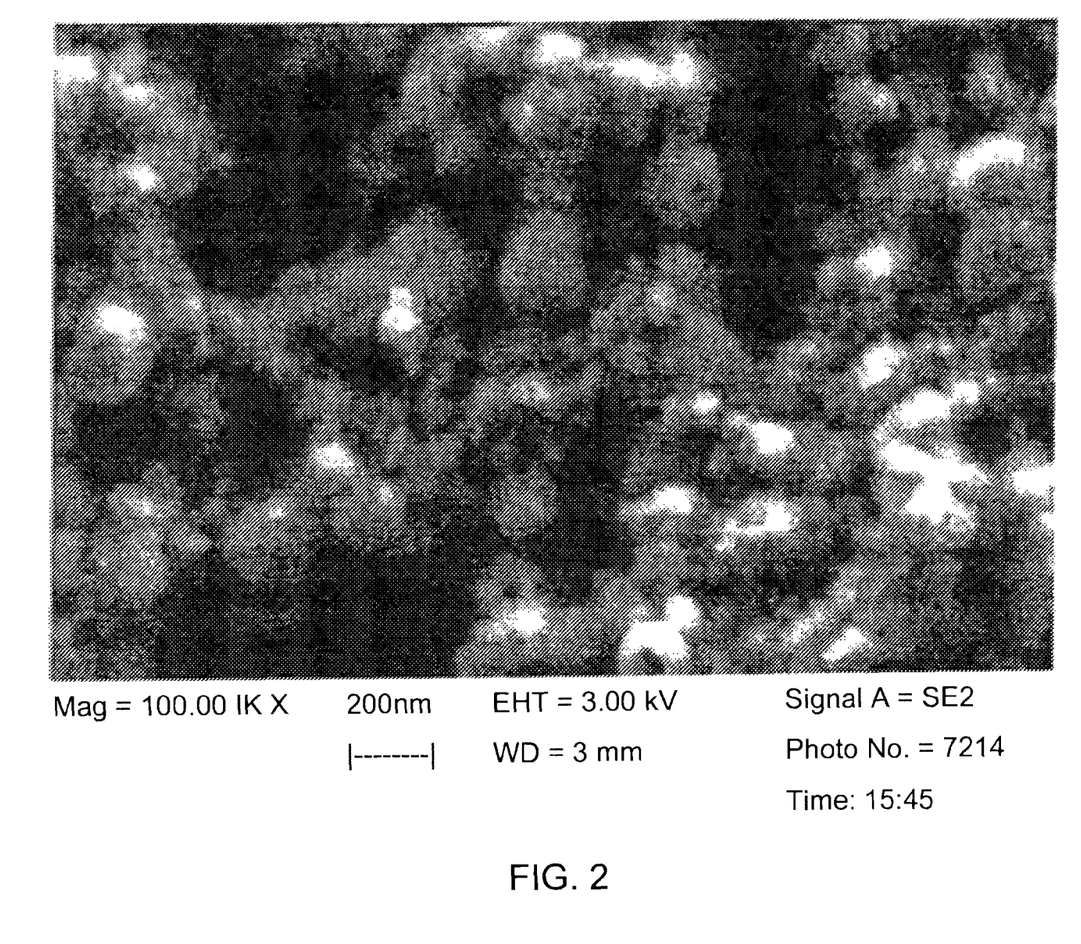
FIG. 2 is a scanning electron micrograph image of silicon nanoparticles made in accordance with the present invention.

Silicon nanoparticles were made using the procedure outlined above with $SiCl_4$ as a nanoparticle precursor and argon as a cavitation gas. An SEM image of the resulting silicon nanoparticles is shown in FIG. 2. The carbon and oxygen peaks are the result of the contamination of the nanoparticles in the laboratory atmosphere.

Example 2

Production of Carbon Nanoparticles

Figure 3:
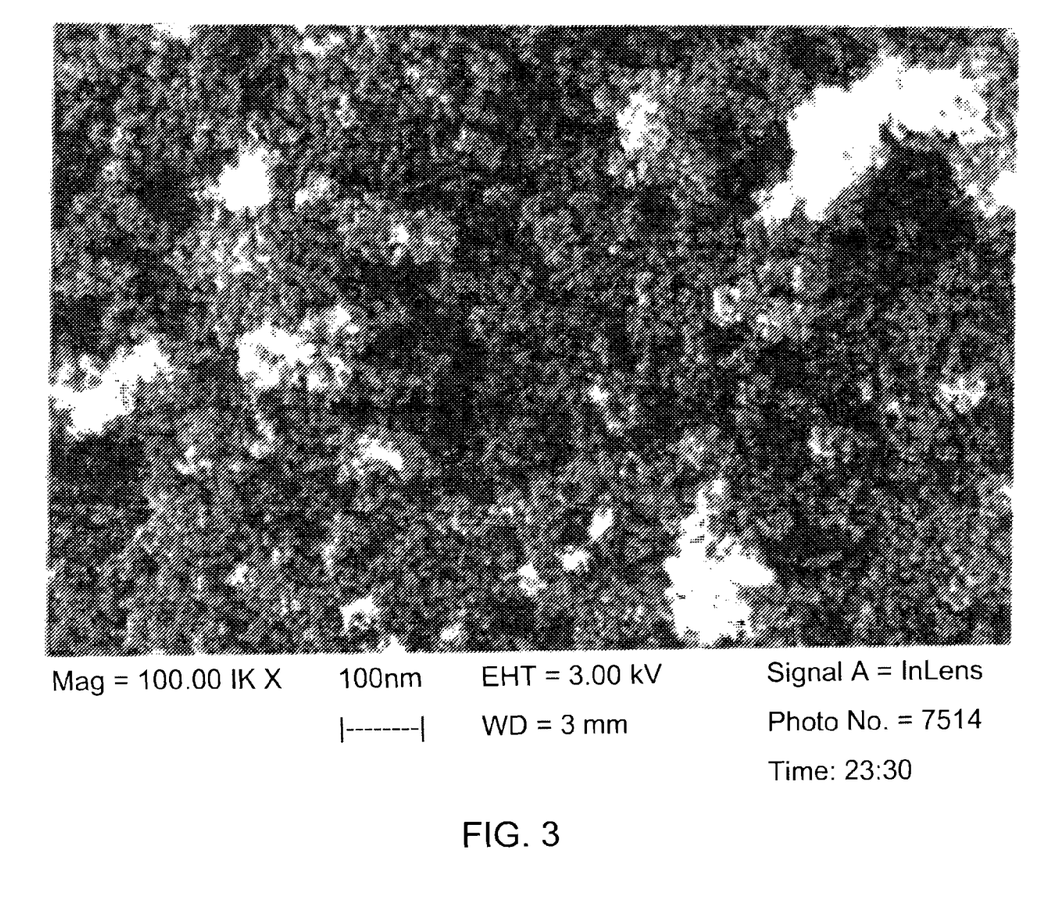
FIG. 3 is a scanning electron micrograph image of carbon nanoparticles made in accordance with the present invention.

Carbon nanoparticles were made using the procedure outlined above with benzene as a nanoparticle precursor and argon as a cavitation gas. An SEM image of the resulting carbon nanoparticles is shown in FIG. 3. The nanoparticles are uniformly sized and have an average diameter of around 15 nm.

Example 3

Production of Si/Ge Nanoparticles

Figure 4:
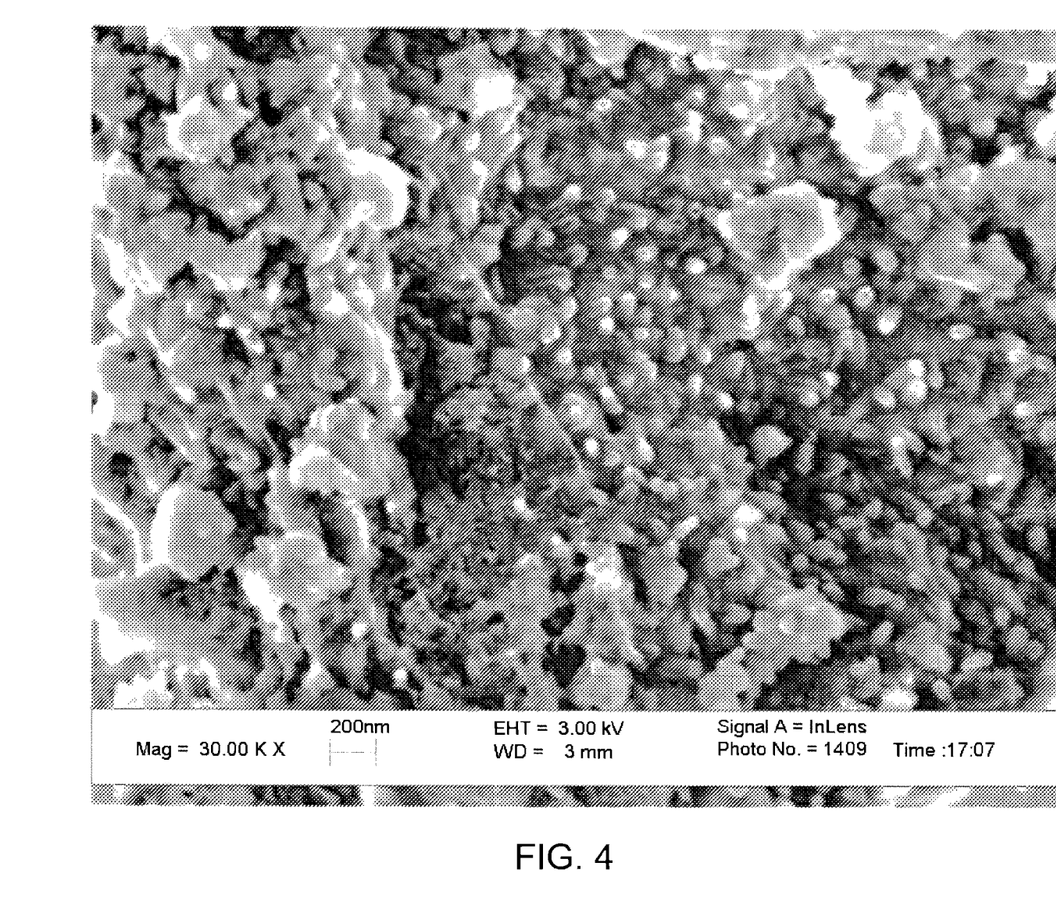
FIG. 4 is a scanning electron micrograph image of Si/Ge nanoparticles made in accordance with the present invention.

Nanoparticles of silicon and germanium alloys (Si/Ge nanoparticles) were made using the procedure outlined above with a mixture of $SiCl_4/GeCl_4$ (80 vol. %/20 vol. %) as a nanoparticle precursor and argon as a cavitation gas. An SEM image of the resulting Si/Ge nanoparticles is shown in FIG. 4. As shown in the figure, the nanoparticles may have an elongated structure. EDS data for the nanoparticles clearly showed the presence of Ge and Si.

For the purposes of this disclosure and unless otherwise specified, "a" or "an" means "one or more." All patents, applications, references and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like include the number recited and refer to ranges which can be subsequently broken down into subranges as discussed above. Finally, as will be understood by one skilled in the art, a range includes each individual member.

While the principles of this invention have been described in connection with specific embodiments, it should be understood clearly that these descriptions are made only by way of example and are not intended to limit the scope of the invention.

What is claimed is:

1. An apparatus for the synthesis of nanoparticles in a dense fluid medium, the apparatus comprising:
   (a) a reaction vessel defining an internal reaction chamber;
   (b) a first electrode housed within the reaction chamber comprising:
      (i) a first discharge face defining a first central electrode opening; and
      (ii) a first electrode wall extending upwardly from the first discharge face and defining a first electrode cavity extending upwardly from the first central electrode opening;
   (c) a second electrode housed within the reaction chamber comprising:
      (i) a second discharge face defining a second central electrode opening; and
      (ii) a second electrode wall extending downwardly from the second discharge face and defining a second electrode cavity extending downwardly from the second central electrode opening;
      wherein the first discharge face is disposed opposite and facing the second discharge face and the first central electrode opening is disposed opposite and facing the second central electrode opening, such that the first discharge face and the second discharge face are separated by a gap and the first electrode cavity, the second electrode cavity, and the gap provide a cavitation zone;
   (d) a gas inlet port that opens into the cavitation zone; and
   (e) a dense fluid medium inlet port for introducing the dense fluid medium into the reaction chamber.

2. The apparatus of claim 1 wherein the gas inlet port comprises:
   (i) an elongated central member comprising an electrically conductive material, the central member having an outer wall and a longitudinal axis; and
   (ii) a hollow elongated insulating member comprising an electrically insulating material, the insulating member having an outer wall and an inner wall disposed coaxially around the central member; wherein the outer wall of the central member and the inner wall of the insulating member are separated by a channel which provides the gas inlet port.

3. The apparatus of claim 1 wherein the central member has a distal end that extends beyond the distal end of the insulating member, and further wherein the second electrode is mounted to the distal end of the central member.

4. The apparatus of claim 3 wherein the gas inlet port further comprises a hollow elongated conducting member comprising an electrically conductive material, the conducting member having an outer wall and an inner wall disposed coaxially around the insulating member, and further wherein the first electrode is mounted to the elongated conducting member.

5. The apparatus of claim 1 wherein the first discharge face and the second discharge face are ring-shaped.

6. The apparatus of claim 5 wherein the ring-shaped discharge faces and the gas inlet port share a common longitudinal axis.

7. The apparatus of claim 1, further comprising a reaction vessel outlet channel in fluid communication with the reaction chamber and one or more magnets disposed around the reaction vessel outlet channel.

8. The apparatus of claim 1, further comprising a gas source in communication with the gas inlet port.

9. The apparatus of claim 1, further comprising a voltage source in electrical communication with one or both of the first and second electrodes.

10. The apparatus of claim 1 wherein the height of the gap is adjustable.

11. The apparatus of claim 1 wherein neither the first nor the second electrode is rotatable.

12. A method of producing nanoparticles, the method comprising:
(a) introducing a dense fluid medium comprising a nanoparticle precursor into a reaction chamber of an apparatus, the apparatus comprising:
   (i) a reaction vessel defining the reaction chamber;
   (ii) a first electrode housed within the reaction chamber comprising:
      (1) a first discharge face defining a first central electrode opening; and
      (2) a first electrode wall extending upwardly from the first discharge face and defining a first electrode cavity extending upwardly from the first central electrode opening;
   (iii) a second electrode housed within the reaction chamber comprising:
      (1) a second discharge face defining a second central electrode opening; and
      (2) a second electrode wall extending downwardly from the second discharge face and defining a second electrode cavity extending downwardly from the second central electrode opening;
      wherein the first discharge face is disposed opposite and facing the second discharge face and the first central electrode opening is disposed opposite and facing the second central electrode opening, such that the first discharge face and the second discharge face are separated by a gap and the first electrode cavity, the second electrode cavity, and the gap provide a cavitation zone;
   (iv) a gas inlet port that opens into the cavitation zone; and
   (v) a dense fluid medium inlet port for introducing the dense fluid medium into the reaction chamber;
(b) introducing a cavitation gas into the cavitation zone through the gas inlet port to create bubbles in the dense fluid medium; and
(c) applying an electric potential between the first discharge face and the second discharge face, thereby creating a plurality of plasma discharges between the first discharge face and the second discharge face for a time sufficient to produce nanoparticles from the nanoparticle precursor, wherein the dense fluid medium is introduced through the dense medium inlet port, such that the cavitation zone is submerged in the dense fluid medium.

13. The method of claim 12 wherein the nanoparticles comprise semiconductor nanoparticles.

14. The method of claim 13 wherein the nanoparticles are silicon nanoparticles.

15. The method of claim 14 wherein the nanoparticle precursor is liquid $SiCl_4$.

16. The method of claim 12 wherein the nanoparticles are carbon nanoparticles.

17. The method of claim 16 wherein the precursor is benzene.

18. The method of claim 12 wherein the nanoparticles comprise magnetic nanoparticles.

19. The method of claim 18 wherein the apparatus further comprises a reaction vessel outlet channel in fluid communication with the reaction chamber and one or more magnets disposed around the reaction vessel outlet channel, the method further comprising passing the dense fluid medium containing the magnetic nanoparticles through the reaction vessel outlet channel.

20. The method of claim 12 wherein the nanoparticles are hybrid nanoparticles comprising an element derived from the nanoparticle precursor and an element sputtered from the first electrode or the second electrode.

21. The method of claim 20 wherein the element derived from the nanoparticle precursor is carbon.

* * * * *